US009990023B2

(12) United States Patent
Paley et al.

(10) Patent No.: US 9,990,023 B2
(45) Date of Patent: Jun. 5, 2018

(54) SYSTEMS AND METHODS FOR HANDLING SUDDEN POWER FAILURES IN SOLID STATE DRIVES

(71) Applicant: Apple Inc., Cupertino, CA (US)

(72) Inventors: Alexander Paley, Cupertino, CA (US); Andrew W. Vogan, Gilroy, CA (US); Eran Sandel, Herzeliya Pituah (IL); Lior Mouler, Herzeliya Pituah (IL); Liran Erez, Cupertino, CA (US); Matthew J. Byom, San Jose, CA (US); Muhammad N. Ashraf, Cupertino, CA (US); Roman Guy, Herzeliya Pituah (IL)

(73) Assignee: APPLE INC., Cupertino, CA (US)

( * ) Notice: Subject to any disclaimer, the term of this patent is extended or adjusted under 35 U.S.C. 154(b) by 122 days.

(21) Appl. No.: 15/219,984

(22) Filed: Jul. 26, 2016

(65) Prior Publication Data

US 2017/0277245 A1 Sep. 28, 2017

Related U.S. Application Data

(60) Provisional application No. 62/314,052, filed on Mar. 28, 2016.

(51) Int. Cl.
G06F 1/32 (2006.01)
G06F 1/26 (2006.01)

(52) U.S. Cl.
CPC ............ *G06F 1/3275* (2013.01); *G06F 1/263* (2013.01); *G06F 1/3287* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 2008/0235441 A1* | 9/2008 | Sherman | ............... G06F 1/3203 711/103 |
| 2013/0024600 A1* | 1/2013 | Wakrat | ............... G06F 12/0246 711/103 |
| 2016/0011806 A1 | 1/2016 | Zaltsman et al. | |

(Continued)

*Primary Examiner* — Zahid Choudhury
(74) *Attorney, Agent, or Firm* — Van Court & Aldridge LLP (57) ABSTRACT

Systems and methods for handling sudden power failures in non-volatile memory devices such as solid state drives are provided by having the non-volatile memory device boot up in a low power write mode, which limits substantially all programming operations to a single level cell (SLC) mode, as opposed to a normal mode in which the programming operations can be performed in a multi-level cell (MLC) mode. Thus, if the system experiences a sudden power failure when it is being powered solely by AC derived power and the battery is below a level sufficient for powering the device while it is programming in the SLC mode, data integrity will be preserved because the programming operation was being performed in SLC mode. The non-volatile memory device may be permitted to exit out the low power write mode into the normal mode when the charge level of the battery is sufficient for powering the system.

15 Claims, 3 Drawing Sheets

(56) References Cited

U.S. PATENT DOCUMENTS

| | | | |
|---|---|---|---|
| 2016/0116974 A1* | 4/2016 | Ginnela | G06F 1/3287 |
| | | | 713/2 |
| 2016/0225459 A1* | 8/2016 | Boysan | G11C 16/30 |
| 2016/0259589 A1* | 9/2016 | Zettsu | G06F 3/0634 |
| 2016/0268000 A1* | 9/2016 | Thompson | G11C 16/30 |

* cited by examiner

SYSTEMS AND METHODS FOR HANDLING SUDDEN POWER FAILURES IN SOLID STATE DRIVES

CROSS REFERENCE TO A RELATED APPLICATION

This application is a non-provisional of U.S. Provisional Patent Application No. 62/314,052, filed Mar. 28, 2016, the disclosure of which is incorporated by reference in its entirety.

TECHNICAL FIELD

This patent specification generally relates to non-volatile memory devices, and more particularly, to handling sudden power failures in solid state drives.

BACKGROUND

Non-volatile storage systems, such as a Solid State Drives (SSD), are typically expected to recover from sudden loss of electrical power with minimal loss of data. However, if sudden power loss occurs during programming of certain types of non-volatile memory, such as those which utilize multi-level cells (MLC) for storage, the integrity of the data stored in those cells may be compromised. Accordingly, what are needed are systems and methods that handle such power failures.

SUMMARY

Systems and methods for handling sudden power failures in non-volatile memory devices such as solid state drives are provided. Embodiments discussed herein preserve data integrity of a non-volatile memory device when it experiences a sudden power failure or loss that occurs when a battery powered device is being powered solely by AC or wall plug power because the battery's charge is below a level sufficient for powering the device, and that AC power is abruptly shut off prior to sufficient charging of the battery. This particular type of sudden power loss provides very little or no advance warning of loss of power to the non-volatile memory device because the withdrawal of the AC power is unknown ahead of time (e.g., the user can pull the power cord out of the system at anytime). As a result, the non-volatile memory system may not be provided with sufficient time to perform various recovery operations in response to a power loss event. This is in contrast to a sudden power loss event that occurs as the result of a battery falling below a charge level sufficient for power the system. Sudden power loss of a system being powered by a battery can be a predicable event because circuitry can assess when the battery will fall below a minimum and can provide sufficient advance notice to the non-volatile memory system to thereby enable it to perform the various operations required of it in response to a power loss event.

Systems and methods according to embodiments discussed herein ensure data integrity of the non-volatile memory system by having it boot up in a low power write mode, which limits substantially all programming operations to a single level cell (SLC) mode, as opposed to a normal mode in which the programming operations can be performed in a multi-level cell (MLC) mode. Thus, if the system experiences a sudden power failure when it is being powered solely by AC derived power and the battery is below a level sufficient for powering the device while it is programming in the SLC mode, data integrity will be preserved because the programming operation was being performed in SLC mode. The non-volatile memory device may be permitted to exit out of the low power write mode into the normal mode when the charge level of the battery is sufficient for powering the system.

In one embodiment, a system includes an AC derived power port, a battery system comprising a battery having a charge level, a non-volatile memory (NVM) storage device operative to receive power from at least one of the battery system and the AC derived power port, the NVM storage device comprising a plurality of memory cells that store data according to one of a SLC mode and a MLC mode, and control circuitry. The control circuitry can be operative to boot the NVM storage device in a low power write mode (LPWM) that forces substantially all program operations to be performed in the SLC mode, and instruct the NVM storage device to exit out of the LPWM into a normal mode when the charge level of the battery is at the charge level above a predetermined threshold.

In another embodiment, a method for data storage can include booting a solid state drive (SSD) in a low power write mode (LPWM), wherein the LPWM preserves data integrity of data stored in at least a portion of the SSD being programmed during a sudden power failure (SPF) event. The method can include determining if a charge level of a battery is above a threshold. If the charge level is below the threshold, enforcing the LPWM such that substantially all program operations are performed in a SLC mode. If the charge level is above the threshold, exiting out of the LPWM such that the SSD operates in a normal mode, wherein in the normal mode, program operations are performed in a MLC mode.

In yet another embodiment, a method for handling sudden power failures in an apparatus comprising a battery system, an AC derived power port, a SSD, and control circuitry is provided. The method can include cold booting the SSD in a LPWM, wherein the LPWM preserves data integrity of data stored in at least a portion of the SSD being programmed during a SPF event that occurs when the battery system is unable to power the apparatus and the apparatus is being powered by power received on the AC derived power port, but the power being received on the AC derived power port is abruptly cut off before the battery is able to power the apparatus, and programming data in a single level cell mode while the SSD is in the LPWM.

A further understanding of the nature and advantages of the embodiments discussed herein may be realized by reference to the remaining portions of the specification and the drawings.

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
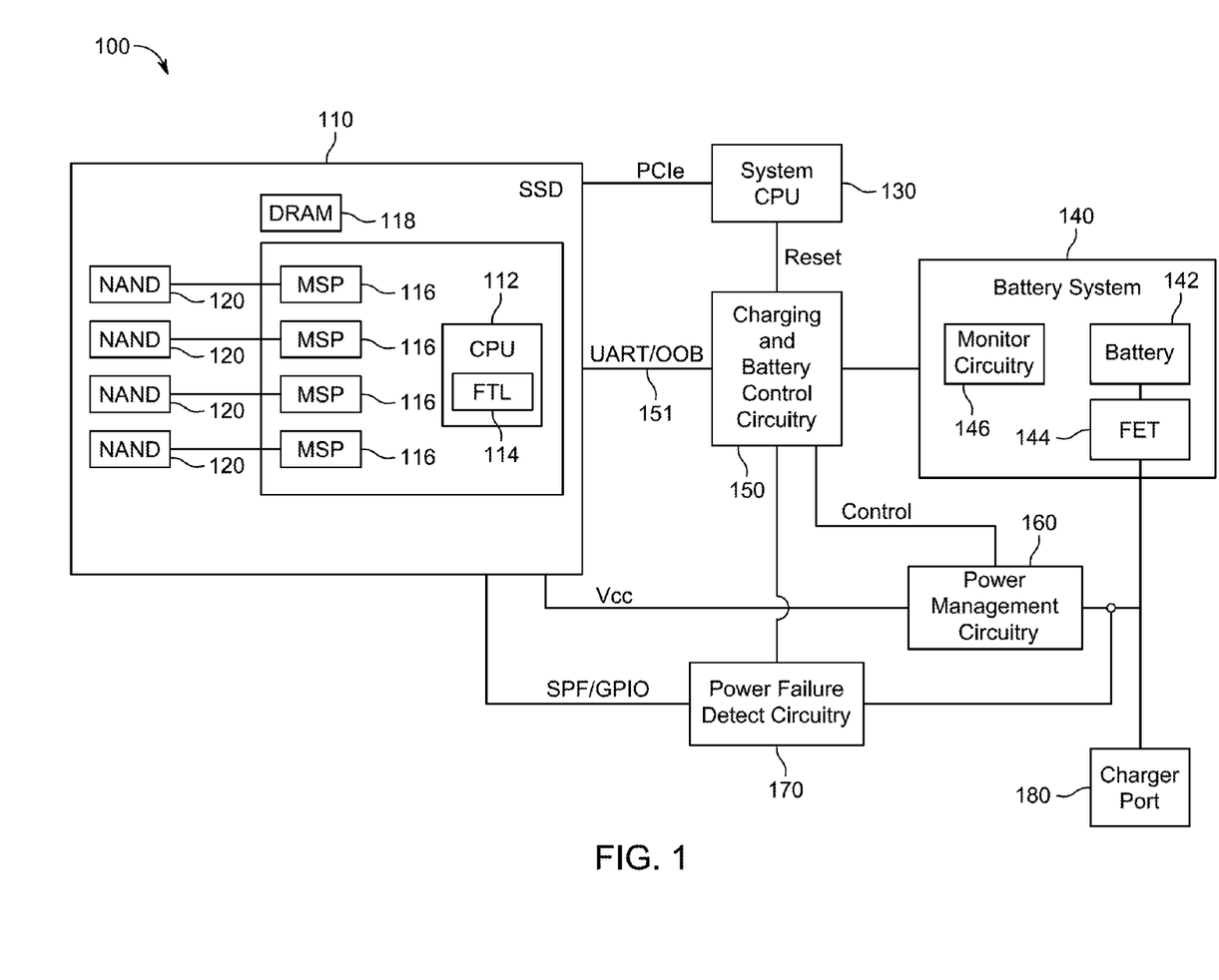
FIG. 1 is a block diagram of a system, in accordance with an embodiment.

FIG. 1 is a block diagram that schematically illustrates a host system 100 that stores data in a memory system, in accordance with an embodiment. In the present example, host system 100 can be a computer (e.g., a laptop) that stores data in a Solid State Drive (SSD) 110. In alternative embodiments, the host system 100 may include, for example, a computing device, a mobile computing device such as a smartphone or tablet or smart watch, a removable memory module ("USB Flash Drive," memory card or similar device), a digital camera, a music or other media player and/or any other system or device in which data is stored and retrieved.

Host system 100 is shown to also include system processor (CPU) 130, battery system 140, charging and battery control circuitry 150, power management circuitry 160, power failure detect circuitry 170, and charger port 180. System processor 130 can store data in SSD 110. It should be appreciated that system processor 130 is merely representative of one of many different host system components that constitute host system 100 and that such components have been omitted to reduce clutter in the FIG. SSD 110 can include an SSD controller 112 that stores data on behalf of system processor 130 in multiple non-volatile memory devices, in the present example NAND Flash devices 120. Any suitable number of memory devices 120 can be used. SSD controller 112 can include a flash translation layer (FTL) 114 for maintaining a logical-to-physical mapping. Controller 112 can carry out the various processing tasks of SSD 110. SSD 110 can include an interface (not shown) for communicating with system processor 130, charging and battery control circuitry 150, and power failure detect circuitry 170, several memory signal processors (MSP) 116 for communicating with and controlling memory devices 120, and a Dynamic Random Access Memory (DRAM) 118.

In the context of the present patent application, the term "analog memory cell" is used to describe any memory cell that holds a continuous, analog value of a physical parameter, such as an electrical voltage or charge. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), resistive RAM (RRAM or ReRAM), phase change RAM (PRAM, also referred to as Phase Change Memory—PCM), and Nitride Read Only Memory (NROM), or any combination thereof. NVM 120 can be organized into "blocks", which can be the smallest erasable unit, and further organized into "pages", which can be the smallest unit that can be programmed or read. In some embodiments, NVM 120 can include multiple integrated circuits (e.g., one or more dies), where each integrated circuit may have multiple blocks. Memory locations (e.g., blocks or pages of blocks) from corresponding integrated circuits may be logically grouped together to form "bands". Bands can provide operational parallelism, thereby enabling programming, reading, and erase operations to be performed in parallel for blocks located on different integrated circuits. Each memory location of NVM 120 can be referenced using a physical address (e.g., a physical page address or physical block address).

NVM 120 can include memory cells that are arranged in multiple rows and columns, and each memory cell comprises a floating-gate transistor. The gates of the transistors in each row are connected by word lines, and the sources of the transistors in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells. In some embodiments, the memory cells are arranged in a three-dimensional (3D) configuration.

The charge levels stored in the cells and/or the analog voltages or currents written into and read out of the cells are referred to herein collectively as analog values, analog storage values or storage values. The storage values may include, for example, threshold voltages or any other suitable kind of storage values. Data is stored in the analog memory cells by programming the cells to assume respective programming states, which are also referred to as programming levels. The programming states are selected from a finite set of possible states, and each programming state corresponds to a certain nominal storage value. For example, a 3 bit/cell Multi-Level Cell can be programmed to assume one of eight possible programming states by writing one of eight possible nominal storage values into the cell. For example, a Single-Level Cell can be programmed to assume one of two programming states by writing one of two nominal storage values into the cell.

Typically, MSP 116 converts data for storage in the memory device to analog storage values and writes them into the memory cells. In alternative embodiments, MSP 116 does not perform the conversion, but is provided with voltage samples, i.e., with the storage values for storage in the cells. When reading data out of memory device 120, MSP 116 converts the storage values of the memory cells into digital samples having a resolution of one or more bits. Data is typically written to and read from the memory cells in groups that are referred to as pages. In some embodiments, MSP 116 can typically erase a group of cells by applying one or more negative erasure pulses to the cells. Erasure is typically performed in entire memory blocks.

SSD controller 112 may be implemented in hardware. Alternatively, SSD controller 112 may comprise a microprocessor that runs suitable software, or a combination of hardware and software elements.

The configuration of FIG. 1 is an exemplary system configuration, which is shown purely for the sake of conceptual clarity. Any other suitable memory system configuration can also be used. Elements that are not necessary for understanding the principles of the disclosed techniques, such as various interfaces, addressing circuits, timing and sequencing circuits and debugging circuits, have been omitted from the figure for clarity.

In the exemplary system configuration shown in FIG. 1, memory devices 120 and SSD controller 112 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which the memory array is disposed. Yet further alternatively, some or all of the functionality of SSD controller 112 can be implemented in software and carried out by a processor or other element of the host system. In some embodiments, system processor 130 and SSD controller 120 may be fabricated on the same die, or on separate dies in the same device package.

In some embodiments, SSD controller 112 includes a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. SSD controller 112 is also referred to herein as a memory controller. In some embodiments, SSD controller 112 and MSP 116 be collectively referred to as memory controller.

Battery system 140 is operative to supply battery power for system 100 and can include battery 142, discharge FET 144, and monitor circuitry 146. Battery system 140 may communicate with charging and battery control circuitry 150. Battery system 140 may supply power to power management circuitry 160, and may be coupled to power failure detect circuitry 170, and charger port 180. Battery 142 may be removable battery or it may be a non-removable battery. Discharge FET 144 is operative to prevent battery 142 from discharging below a minimum charge threshold. When FET 144 is turned ON, no power is supplied to power management circuitry 160. Monitor circuity 146 monitors the charge level of battery 142 and can provide charge status information to charging and battery control circuitry 150. Monitor circuitry 146 may also control activation of discharge FET 144.

Charging and battery control circuitry 150 may manage operation of battery system 140 and power management circuity 160. Charging and battery and control circuitry 150 may also communicate with SSD 110 and power failure detect circuitry 170. Circuitry 150 can control the charging of battery 142 via power received through charger port 180. Circuitry 150 can also instruct battery system 140 to activate and/or deactivate FET 144 based on charge level of battery 142 reported by monitor circuitry 146. Circuitry 150 can also instruct power management circuitry 160 to change its settings based on the power mode and/or NVM operational mode of system 100. The power mode can exist in several states as illustrated in table 1 below.

TABLE 1

Power Modes

Battery Only; No AC derived power
AC derived power and Battery, with Battery above minimum charge level
AC derived power and NO Battery, with Battery below minimum charge level In the battery only power mode, system 100 is deriving all of its operational power from battery system 140. In AC derived power and battery mode, system 100 is receiving rectified wall power via port 180 and battery 142 is charged above a minimum charge level. The minimum charge level may be the minimum level of battery charge required to prevent FET 144 from activating and is sufficient to power system 100 if the AC derived power is no longer available via charger port 180. In the AC derived power and no battery mode, system 100 is powered solely by AC derived power because the charge of battery 142 is below the minimum charge level. Battery 142 is being charged when in this mode, but it has not yet exceeded the minimum charge level. When battery 142 is below the minimum charge level, FET 144 is activated to prevent further discharge of battery 142, and battery system 140 is not yet able to power system 100. Thus, if the AC derived power is removed when system 100 is in this mode, system 100 would shut down because battery system 140 is unable to independently power system 100. The various power failure embodiments discussed herein are handled when system 100 is operating in this AC derived power and NO battery mode. Charging and battery control circuitry 150 may switch from the AC derived power and NO battery mode to the AC derived power and battery mode when the charge level of battery 142 exceeds the minimum charge level.

Charging and battery control circuitry 150 may instruct SSD 110 to operate in a LPWM mode or a normal mode by communicating commands to SSD 110 over communications line 151. Line 151 may support UART or out-of-band (OOB) communications protocols for conveying operational mode instructions. These protocols are merely illustrative and other protocols may be used for communicating. Whether SSD 110 operates according to the LPWM or the normal mode may depend on a variety of factors. One factor can be boot status, as different boot paradigms may dictate whether SSD 110 should operate in LPWM or normal mode, and another factor can be battery status, as the battery charge status can indicate whether SSD 110 can exit out of LPWM into the normal mode. Boot status can include cold boot and warm boot. As defined herein, a cold boot exists when system 100 is being booted after it has been completely powered OFF (e.g., as a result of power loss or dead battery, or user activated powering down system 100). In a cold boot, there is no booting from DRAM. As defined herein, a warm boot exists when system 100 is being booted from DRAM when system 100 is in a reduced power state. A reduce power state is a state existing between a fully ON state and the completely powered OFF state.

When system 100 is engaged in a cold boot, charging and battery control circuitry 150 may instruct SSD 110 to operate in the LPWM. When system 100 is engaged in a warm boot, circuitry 150 may instruct SSD 110 to operate in the mode it was in prior to entering into the reduced power state. For example, if SSD 110 was operating in the LPWM prior to entering into the reduced power state, circuitry 150 may ensure that SSD 110 continues to operate in the LPWM mode during the warm boot. If SSD 110 was operating in the normal mode prior to entering into the reduced power state, circuitry 150 may ensure that SSD continues to operate in the normal mode during the warm boot.

Charging and battery control circuitry 150 may instruct SSD 110 to exit out of LPWM and operate according to the normal mode. Circuitry 150 may provide this instruction when it receives a notice from battery system 140 indicating that the charge level of battery 142 exceeds the minimum charge threshold. In some embodiments the transition from LPWM to normal is one-way only. That is, in such embodiments once SSD 110 has entered into the normal mode, it cannot switch back to LPWM while system 100 is powered. SSD 110 can ignore any subsequent host attempts to switch to LPWM while system 100 is powered. As discussed above. SSD 110 enters into the LPWM when it is booted in a cold boot.

Power management circuitry 160 can control, among things, timing parameters related to delay timing in SPF events. That is, during an SPF event, which notification may be provided by power failure detection circuitry 170, SSD 110 is required to complete various operations within delay timing parameters. In particular, the delay can be defined by the time between a reset command and write protect command. These delay timing parameters may vary depending on whether SSD 110 is LPWM or normal mode. For example, in LPWM mode, charging and control circuitry 150 may instruct power management circuitry 160 to operate according to a first delay period (e.g., 0 seconds) for the delay period between reset and write protect in order to support SPF delay time (e.g., 1.5 µs) for LPWM. In the normal mode, charging and control circuitry 150 may instruct power management circuitry 160 to operate according to a second delay period (e.g., 7 milli-seconds) for the delay period between reset and write protect in order to support SPF delay time (e.g., 10 ms) for the normal mode. The second delay period can be an order of magnitude longer than the first time delay period. The second time delay period may be greater than the first time delay period because system 100 is operating in a power mode that provides additional time for SSD 110 to complete it operations in response to power failure notification. For example, if system 100 is operating in the battery only mode, battery system 140 is aware of its current charge and is able to provide sufficient notice to SSD 110 via the appropriate communications path. However, when system 100 is operating in the AC derived power and NO battery mode, power can suddenly fail when the AC derived power source is disconnected. There is virtually no pre-notice of the AC derived power source failure, and hence the delay timing parameter for LPWM must be substantially less than the normal mode timing parameters.

Certain limitations may be placed on the operations performed by the SSD when it is in LPWM. These limitations may be imposed to ensure the integrity of data stored in SSD 110 in the event of sudden power failures when system 100 is operating in the AC derived power and NO battery power mode. In LPWM, substantially all program operations, including programming of user data, are performed in SLC mode. Limiting program operations to SLC mode in the LPWM can prevent issues that can occur during sudden power failures while MLC mode program operations are performed in memory devices 120. Programming operations in MLC mode are particularly sensitive to interruptions (e.g., such as a sudden power loss). If a MLC mode programming operation is interrupted, the analog values (e.g., threshold voltages) of the memory cells may be distorted, and this distortion may corrupt both the least significant bit data and the most significant bit data.

Garbage collection operations may be the only program operation that is permitted to operate in MLC mode when SSD 110 is in LPWM. Flash translation layer 114, however, may be required to commit the garbage collection mappings only after the destination block is successfully programmed. Garbage collection operations may be the only operation that can be performed in MLC mode when SSD 110 is in LPWM because the data being garbage collected is backed up else wherein in SSD 110. Thus, if a SPF occurs during a garbage collection operation, that data can be recovered from the backup location in SSD 110. In contrast, host driven program operations do not benefit from the luxury of having a backup and thus are not permitted to engage in MLC mode program operations in LPWM.

Other operations such as erase and read operations may not be limited when SSD 110 is in LPWM. In fact, erase and read operations may perform similar as to how they would perform when SSD 110 is operating in the normal mode.

Figure 2:
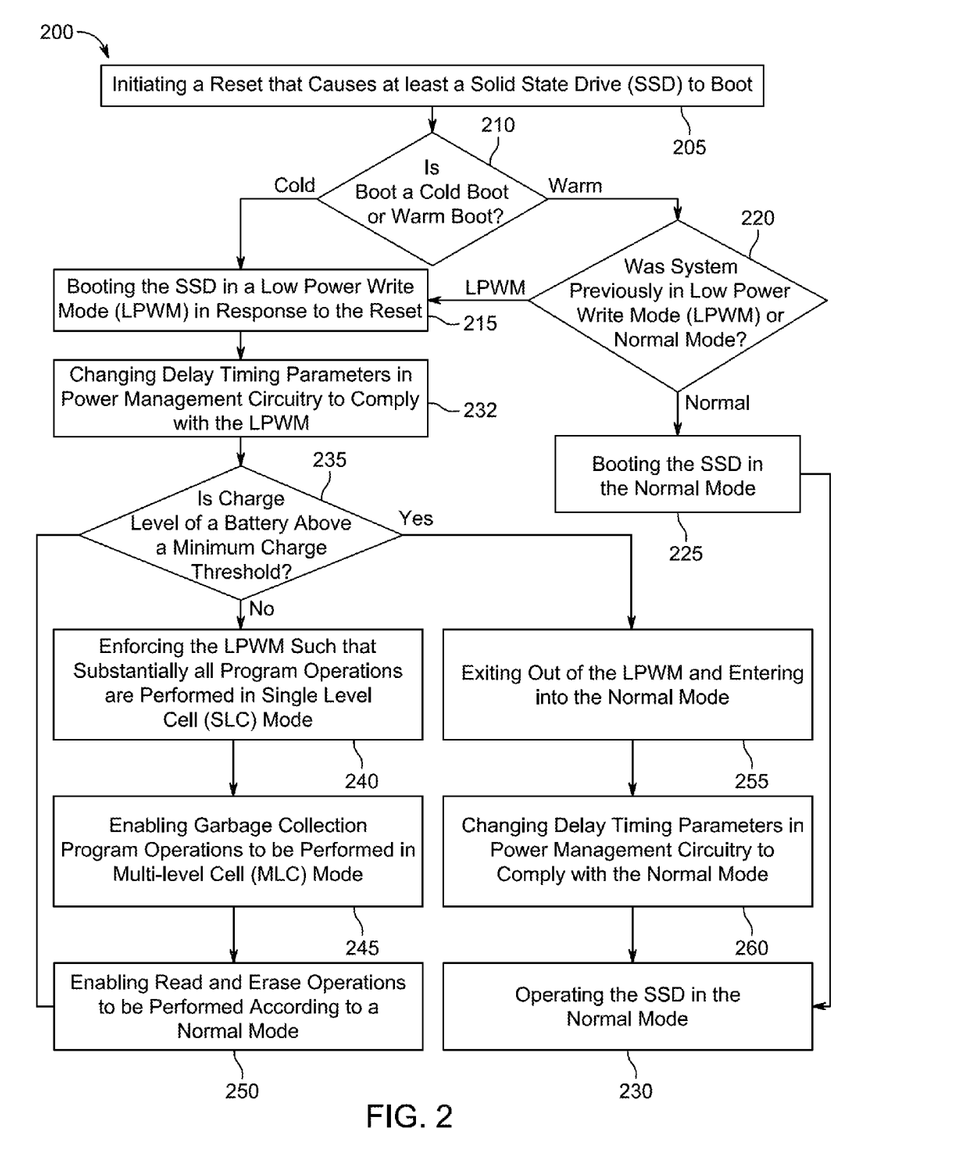
FIG. 2 shows an illustrative process, according to an embodiment.

FIG. 2 shows an illustrative process 200 according to an embodiment. Process 200 can begin at step 205 by initiating a reset that causes at least a SSD (e.g., SSD 110) to boot. The reset may be triggered, for example, by system processor 130, or in response to cold boot or a warm boot. At step 210, a determination is made whether the boot is a cold boot or a warm boot. If it is determined that the boot is a cold boot, process 200 may proceed with booting the SSD in the LPWM in response to the reset, as indicated at step 215. If it is determined that the boot is a warm boot, process 200 further determines whether the system (e.g., system 100) was previously in the LPWM or in the normal mode, step 220. If the system was previously in LPWM, process 200 proceeds to step 215. If the system was previously in the normal mode, process 200 boots the SSD in the normal mode, at step 225, and then proceeds to step 230 so that the SSD can operate in the normal mode.

If the SSD booted in the LPWM at step 215, process 200 can change the delay timing parameters in power management circuitry (e.g., circuitry 160) to comply with the LPWM timing requirements, at step 232. Process 200 can then determine (at step 235) whether a charge level of a battery (e.g., battery 142) is above a minimum threshold charge. As explained above, the charge level of the battery and whether the system is receiving AC derived power can dictate whether the system can switch to another power mode and exit out LPWM. If the determination at step 235 is NO, process 200 can proceed to step 240. At step 240, the LPWM can be enforced such that substantially all program operations are performed in SLC mode. At step 245, garbage collection operations can be performed in MLC mode even though the SSD is in LPWM. At step 250, read and erase operations can be enabled to be performed according to the normal mode. Following step 250, process 200 loops back to step 235.

If the determination at step 235 is YES, process 200 exits out the LPWM and enters into the normal mode at step 255. The delay timing parameters in power management circuitry (e.g., circuitry 160) can be changed to comply with the normal timing requirements, at step 260. The SSD can proceed to operate in the normal mode at step 230.

It should be appreciated that the steps shown in FIG. 2 are merely illustrative and that additional steps may be added, some steps may be omitted, and the order of the steps can be changed.

Figure 3:
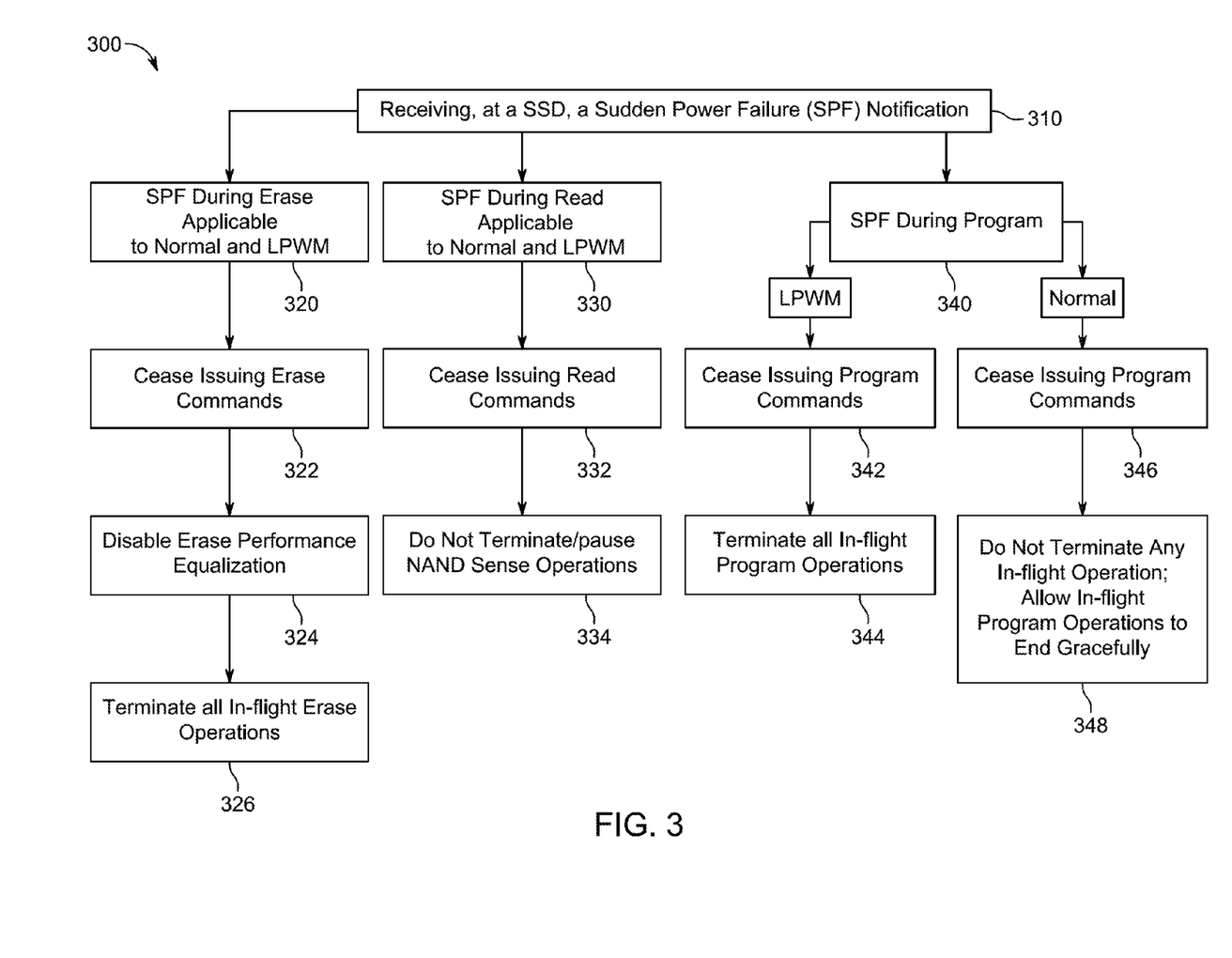
FIG. 3 shows an illustrative process of steps that may be executed by the SSD in response to receiving notice of a sudden power failure, according to an embodiment.

FIG. 3 shows an illustrative process 300 of steps that may be executed by the SSD in response to receiving notice of a SPF, according to an embodiment. The SPF notification may be provided by power failure circuitry 170 over a general purpose input/output (GPIO) or other I/O link existing between circuitry 170 and SSD 110. When the SSD receives a SPF notification (at step 310), the SSD performs several different operations to ensure that it has finished SFP event handling within a fixed period of time (e.g., 500 µs) within receiving the SFP notice. For example, MSP 116 should cease all operations within that fixed period of time. FIG. 3 shows that the steps performed in response to the received SPF notification are split into three categories corresponding to SPF handling during erase, read and program operations. Starting on the left side of FIG. 3, SPF during erase is handled the same regardless of whether the SSD is in normal mode or LPWM (step 320). At step 322, erase commands are prevented from being issued. Erase performance equalization is disabled, at step 324. All in-flight erase operations are terminated at step 326. Operations can be terminated by sending a soft-reset command, which resets an internal state machine without power cycling memory devices 120.

If SPF notification is received during a read operation (step 330), the SSD performs the following steps regardless of whether the SSD is operating in the normal mode or LPWM. At step 332, read commands are no longer issued. At step 334, there is no need to terminate memory device sense operations because of the cessation of issued read commands at step 332.

If SPF notification is received during a program operation (step 340), the SSD performs steps 342 and 344 if the SSD is operating in LPWM and performs steps 346 and 348 if the SSD is operating in the normal mode. At step 342, program commands are no longer issued, and at step 344, all in-flight program operations are terminated. Program operations can be terminated by sending a soft-reset (or abort) command to memory devices 120. At step 346, program commands are no longer issued. At step 348, in-flight program operations are allowed to end gracefully. In other words, the in-flight program operations are not terminated.

It should be appreciated that the steps shown in FIG. 3 are merely illustrative and that additional steps may be added, some steps may be omitted, and the order of the steps can be changed.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Thus, references to the details of the described embodiments are not intended to limit their scope.

What is claimed is:

1. A system, comprising
an AC derived power port;
a battery system comprising a battery having a charge level;
a non-volatile memory (NVM) storage device operative to receive power from at least one of the battery system and the AC derived power port, the NVM storage device comprising a plurality of memory cells that store data according to one of a single level cell (SLC) mode and a multi-level cell (MLC) mode;
control circuitry operative to:
  boot the NVM storage device in a low power write mode (LPWM) that forces all program operations to be performed in the SLC mode; and
  instruct the NVM storage device to exit out of the LPWM into a normal mode when the charge level of the battery is at the charge level above a minimum predetermined threshold; and
power management circuitry coupled to the battery system, NVM storage device, control circuitry, and the AC derived power port, wherein when the NVM storage device is in the LPWM, the control circuitry instructs the power management circuitry to set its delay timing parameter to a LPWM SPF time period, and wherein when the NVM storage device is in the normal mode, the control circuitry instructs the power management circuitry to set its delay timing parameter to a normal mode SPF time period, where the normal mode SPF time period is at least one order of magnitude longer than the LPWM SPF time period.

2. The system of claim 1, wherein in the LPWM, garbage collection program operations are the only program operations performed in the MLC mode.

3. The system of claim 1, wherein the LPWM preserves data integrity of data stored in at least a portion of the plurality of memory cells being programmed during a sudden power failure (SPF) event.

4. The system of claim 3, wherein the SPF event occurs when the charge level is at the charge below the predetermined threshold and the AC derived power port abruptly ceases to supply power to the NVM storage device.

5. The system of claim 1, wherein in the normal mode, program operations are performed in the MLC mode.

6. The system of claim 1, wherein the delay timing parameter defines a maximum delay period between reset and write protect.

7. The system of claim 1, further comprising power failure detect circuitry coupled to the NVM storage device, the battery system, and the AC derived power port, the power failure detect circuitry operative to provide a SPF notification to the NVM storage device, wherein the NVM storage device, in response to receiving the SPF notification during a programming operation and while in the LPWM, is operative to:
cease issuing program commands; and
terminate all in-flight program operations.

8. The system of claim 1, wherein the system is a computer and the NVM storage device is a solid state drive (SSD).

9. A method for data storage, comprising:
booting a solid state drive (SSD) in a low power write mode (LPWM), wherein the LPWM preserves data integrity of data stored in at least a portion of the SSD being programmed during a sudden power failure (SPF) event;
determining if a charge level of a battery is above a threshold;
if the charge level is below the threshold, enforcing the LPWM such that all program operations are performed in a single-level cell (SLC) mode;
if the charge level is above the threshold, exiting out of the LPWM such that the SSD operates in a normal mode, wherein in the normal mode, program operations are performed in a multi-level cell (MLC) mode; and
receiving a SPF notification while programming data in the LPWM;
ceasing further issuance of program commands in response to the received SPF notification; and
terminating all in-flight program operations in response to the received SPF notification.

10. The method of claim 9, further comprising supplying power from an AC derived power port to the SSD when the charge level is less than the threshold, wherein the SPF event occurs when the charge level is at the charge below the threshold and the AC derived power port abruptly ceases to supply power to the SSD.

11. The method of claim 9, wherein the enforcing comprises enabling garbage collection program operations to be performed in the MLC mode.

12. The method of claim 9, wherein the enforcing comprises enabling read and erase operations to be performed according to the normal mode.

13. The method of claim 9, further comprising preventing the SSD from returning to the LPWM after the SSD had previously exited out of the LPWM mode, wherein the preventing persists until the SSD cold boots in the LPWM mode.

14. The method of claim 9, further comprising changing a delay timing parameter in power management circuitry to comply with one of the LPWM and the normal mode, wherein the delay timing parameter defines a time between assertions of write protect and reset of the SSD.

15. A method for handling sudden power failures in an apparatus comprising a battery system, an AC derived power port, a solid state drive (SSD), and control circuitry, the method comprising:

cold booting the SSD in a low power write mode (LPWM), wherein the LPWM preserves data integrity of data stored in at least a portion of the SSD being programmed during a sudden power failure (SPF) event that occurs when the battery system is unable to power the apparatus and the apparatus is being powered by power received on the AC derived power port, but the power being received on the AC derived power port is abruptly cut off before the battery is able to power the apparatus;

programming data in a single level cell mode while the SSD is in the LPWM;

transitioning the SSD from the LPWM to a normal mode when the battery is able to power the apparatus, wherein in the normal mode, the SSD programs data in a multi-level cell mode; and changing a delay timing parameter in power management circuitry to comply with one of the LPWM and the normal mode, wherein the delay timing parameter defines a time between assertions of write protect and reset of the SSD, wherein the delay timing parameter associated with the LPWM mode is on order of magnitude less than the delay timing parameter associated with the normal mode.

* * * * *